H. O. KING.
JACK SHAFT SPROCKET BEARING FOR AUTOMOBILE TRUCKS.
APPLICATION FILED MAY 19, 1917.
1,288,032.
Patented Dec. 17, 1918.
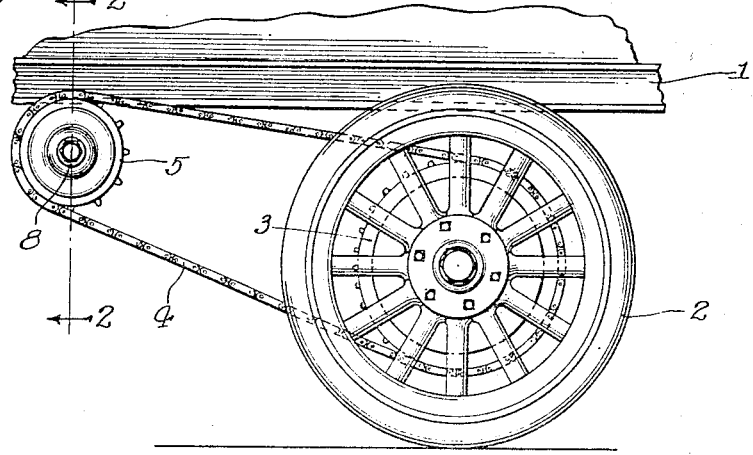
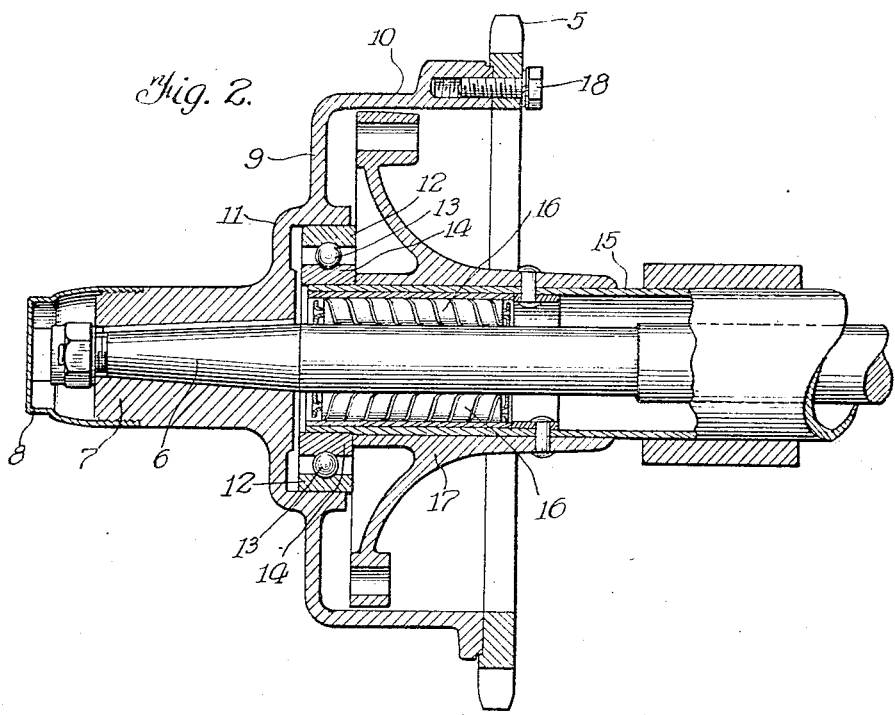
Witnesses:
Inventor:
Harry O. King,

# UNITED STATES PATENT OFFICE.

HARRY ORLAND KING, OF CHICAGO, ILLINOIS, ASSIGNOR TO PHENIX TRUCK MAKERS INC., OF CHICAGO, ILLINOIS, A CORPORATION.

JACK-SHAFT-SPROCKET BEARING FOR AUTOMOBILE-TRUCKS.

1,288,032.         Specification of Letters Patent.         Patented Dec. 17, 1918.

Application filed May 19, 1917.   Serial No. 169,607.

*To all whom it may concern:*

Be it known that I, Harry O. King, a citizen of the United States, and a resident of Chicago, county of Cook, and State of Illinois, have invented a new and useful Improvement in Jack-Shaft-Sprocket Bearings for Automobile-Trucks, of which the following is a specification.

My invention relates especially to that class of trucks that are made by converting a pleasure car chassis into a truck and the object is to improve the bearings of the jack shaft whereon the driving sprocket is fixed which carries the chain running to the truck driving wheel and the invention is set forth in the claims.

Reference will be had to the accompanying drawings in which:

Figure 1 shows a side elevation in diagram of the rear wheel of a truck and the jack shaft sprocket.

Fig. 2 is a vertical sectional elevation on line 2—2 of Fig. 1.

In the drawings 1 indicates the frame of the chassis of an ordinary truck converted from a passenger chassis. 2 indicates the rear wheel, 3 the driving sprocket attached thereto, 4 the driving chain and 5 the jack shaft sprocket and 6 the jack shaft itself, which is the rear axle shaft of the pleasure car chassis.

7 indicates the hub on the jack shaft which is covered by the hub cap 8.

In the web 9 of the sprocket supporting wheel 10 which is connected to the hub 7 there is a bearing recess 11 in which there is contained a ball bearing ring 12 working on the balls 13 running on the inner raceway 14 which is fixed on the end of the shaft tube 15 and thus this ball bearing sustains load from the sprocket wheel 5 since the latter is connected by the screws 18 to the wheel 10.

The jack shaft 6 is also supported from the inside of the tube 15 by means of the roller bearing 16 of the type known as Hyatt.

On the end of the tube 15 there is the casting 17. The shaft 6, tube 15, bearing 16 and casting 17 are the normal parts of an ordinary rear axle of a Ford pleasure car and when the pleasure car chassis is converted to truck use the rear wheels of the pleasure car chassis are taken off the shaft 6 and a sprocket wheel is placed thereon as indicated. In order to maintain the normal tread or track of the rear wheels of the truck made by converting a pleasure car chassis, the driving sprocket cannot be placed on the shaft 6 at the same location formerly occupied by the wheel of the pleasure car, but must be set inward a considerable distance in order to bring the chain 4 inside the wheel 2 as required.

In converting the rear axles of pleasure cars for the jack shafts of trucks the custom has been to support the sprocket 5 in the position that I have indicated without using my ball bearing as set forth by 12, 13 and 14, and hence all the strain of the sprocket chain is then borne on the roller bearing 16 having been transmitted directly to the end of the shaft 6 by the hub 7. This puts a severe bending moment in the shaft 6 and overstrains the roller bearing 16 as the strains involved in truck service are greater than what are encountered by those parts in their normal pleasure car service. By the use of my ball bearing as indicated a part of the load of the sprocket chain 4 on the sprocket 5 is transmitted directly to the end of the tube 15, thereby lessening the load that must be carried by the shaft 6 and the bearing 16. This arrangement adds to the durability of those parts in truck service and operates at less power loss than the former arrangement.

What I claim is:

1. In a converted rig of the class described a supplemental bearing interposed directly between the sprocket wheel on the jack shaft and the axle tube of said shaft in combination with the regular bearing on said shaft located within the said tube.

2. In a device of the class described, a wheel carrying a sprocket and mounted on a driving shaft and the latter inclosed within a tube, an anti-friction bearing on the inside of the tube and on the said shaft and an anti-friction bearing on the outside of the tube in connection with the said sprocket carrying wheel direct.

3. In a device of the class described, a sprocket carrying wheel with its hub mounted normally in place of the traction wheel of the rear axle of a pleasure car, a seat in the said sprocket carrying wheel adapted to contain an anti-friction bearing located on the outside of the normal axle tube used in the pleasure car service.

4. In a device of the class described, in combination with the normal pleasure car bearing for the rear axle wheel when the same is used for a jack shaft of a truck, a supplemental bearing on the outside of the driving shaft tube.

5. In a device of the class described, in combination with the normal rear axle of a pleasure car used as a jack shaft in a truck, a sprocket wheel having its pitch line located over the axle tube and inward from the normal tread of the wheels and supported on the driving axle and provided with supplemental bearing interposed between the sprocket wheel and the outside of the tube in addition to the normal bearing on the inside of the tube.

Signed at Chicago, in the county of Cook and State of Illinois, this 16th day of May, 1917.

HARRY ORLAND KING.

Witnesses:
ALBERT J. SAUSER,
B. J. BERNHARD.

Copies of this patent may be obtained for five cents each, by addressing the "Commissioner of Patents, Washington, D. C."